(12) United States Patent
Resh (10) Patent No.: US 11,105,108 B2
(45) Date of Patent: Aug. 31, 2021

(54) POOL CLEANING APPARATUS AND RELATED METHODS

(71) Applicant: Eric V. Resh, Murrieta, CA (US)

(72) Inventor: Eric V. Resh, Murrieta, CA (US)

(73) Assignee: RESH, INC., Murrieta, CA (US)

( * ) Notice: Subject to any disclaimer, the term of this patent is extended or adjusted under 35 U.S.C. 154(b) by 246 days.

(21) Appl. No.: 15/970,045

(22) Filed: May 3, 2018

(65) Prior Publication Data

US 2018/0320397 A1     Nov. 8, 2018

Related U.S. Application Data

(63) Continuation-in-part of application No. 13/193,188, filed on Jul. 28, 2011, now abandoned, and a
(Continued)

(51) Int. Cl.
*E04H 4/16* (2006.01)
*F16B 5/06* (2006.01)

(52) U.S. Cl.
CPC .......... *E04H 4/1609* (2013.01); *F16B 5/0635* (2013.01)

(58) Field of Classification Search
CPC .................................................. E04H 4/1609
See application file for complete search history.

(56) References Cited

U.S. PATENT DOCUMENTS

| | | |
|---|---|---|
| 227,266 A | 5/1880 | Kirk |
| 2,099,030 A | 11/1937 | Morison |

(Continued)

FOREIGN PATENT DOCUMENTS

| | | |
|---|---|---|
| AU | 14095/92 | 12/1993 |
| CA | 477632 | 10/1951 |

OTHER PUBLICATIONS

T & K Pool Products Mfg., "Installation Instructions", 1 page, Jul. 29, 1994.

(Continued)

*Primary Examiner* — Randall E Chin
(74) *Attorney, Agent, or Firm* — J. Mark Holland + Associates; J. Mark Holland; Alison Adnan (57) ABSTRACT

A tool for cleaning debris from swimming pools includes a frame, a corresponding net, and retaining member for retaining the net on the frame. The preferred retaining member is an elongated strip of resilient, flexible material, having a generally U-shaped cross-section. The web portion of the cross-section includes an exterior surface smoothly shaped between its two edges to urge debris from the pool into the net. The leg portions of the cross-section include gripping portions to assist in engaging and/or disengaging the retaining member from the frame, to permit the net to be assembled, changed or replaced. Preferably, the retaining member is formed from at least two different materials. The preferred frame of the tool is fabricated from aluminum and includes an elongated, curved frame portion with its ends permanently assembled into the end of a tubular attachment member, to permit attachment of the tool to a handle, pole or similar structure. The preferred net of the tool includes one or more anti-slip devices to prevent the edge of the net or bag from slipping between the frame portion and retaining member. A corresponding preferred method of use is also disclosed.

19 Claims, 9 Drawing Sheets

Related U.S. Application Data continuation-in-part of application No. 13/773,521, filed on Feb. 21, 2013, now Pat. No. 9,976,316.

(56) References Cited

U.S. PATENT DOCUMENTS

| | | |
|---|---|---|
| 2,205,706 A | 6/1940 | Wolff |
| 2,420,087 A | 5/1947 | Meek |
| 2,464,921 A | 3/1949 | Chandler |
| 2,486,163 A | 10/1949 | Jennings et al. |
| 2,583,987 A | 1/1952 | Baison |
| 2,853,195 A | 9/1958 | Malcolm |
| 2,867,331 A | 1/1959 | Bader |
| 2,939,238 A | 6/1960 | Ertel et al. |
| 3,121,248 A | 2/1964 | Ferguson |
| 3,188,668 A | 6/1965 | Buckelew |
| 3,220,037 A | 11/1965 | Ruhling |
| 3,368,686 A | 2/1968 | Petrik |
| 3,688,483 A | 9/1972 | Hamilton |
| 3,754,785 A | 8/1973 | Anderson |
| 3,863,237 A | 1/1975 | Doer |
| 3,962,758 A | 6/1976 | Knappe |
| 3,979,146 A | 9/1976 | Berg |
| 4,003,100 A | 1/1977 | Whitaker |
| 4,013,563 A | 3/1977 | Petrik |
| 4,021,994 A | 5/1977 | Mainprice |
| 4,034,710 A | 7/1977 | Carter |
| 4,152,801 A | 5/1979 | Lieber |
| 4,169,331 A | 10/1979 | Baker |
| 4,176,419 A | 12/1979 | MacDonald |
| 4,198,720 A | 4/1980 | Matsumoto |
| 4,225,437 A | 9/1980 | Woodward |
| 4,338,697 A | 7/1982 | Broadwater |
| 4,349,224 A | 9/1982 | Shiozaki |
| 4,452,801 A | 6/1984 | Lieber |
| 4,481,117 A | 11/1984 | Collins |
| 4,709,436 A | 12/1987 | Berheld |
| 4,846,972 A | 7/1989 | Anderson |
| 4,864,972 A | 9/1989 | Batey et al. |
| 4,880,531 A | 11/1989 | Blake et al. |
| D311,796 S | 10/1990 | Collins |
| 4,994,178 A | 2/1991 | Brooks |
| 5,137,623 A | 8/1992 | Wall et al. |
| 5,342,513 A | 8/1994 | Wall |
| 5,473,786 A | 12/1995 | Resh |
| 5,749,117 A | 5/1998 | Forsline |
| 5,858,221 A | 1/1999 | Conrad |
| 6,302,277 B1 | 10/2001 | Resh |
| 6,358,410 B1 | 3/2002 | Lambert |
| 6,368,502 B1 | 4/2002 | Resh |
| 7,155,771 B2 | 1/2007 | Re |
| 7,392,909 B1 | 7/2008 | Conrad |
| 7,891,132 B2 | 2/2011 | Hetzner |
| 2005/0103281 A1 | 5/2005 | Picozza |
| 2007/0151065 A1 | 7/2007 | Monahan |
| 2014/0230172 A1 | 8/2014 | Resh |
| 2018/0119442 A1* | 5/2018 | Travis .................. E04H 4/1609 |

OTHER PUBLICATIONS

Purity Pool, "New Specialty Rakes from Purity Pool", 2 pages, Jul. 29, 1994.
Purity Pool, "What's It All About?", 2 pages, Jul. 29, 1994.
Aquatic Products Company, "Aquapro" Advertisement, 3 pages, Jun. 14, 1994.
Facsimile Photocopy of a Cross-Section of "Pool Pals Rake With Wide Pocket", Purchased Approximately Aug. 1995.
Blue Devil, "Setting a Standard for Quality", 4 pages, Jun. 1994.
OREQ Animal Net, 1 image, Sep. 29, 2014.
OREQ Animal Skimmer Net, 1 image, Sep. 29, 2014.
OREQ Gorilla Net, 1 image, Sep. 29, 2014.
OREQ Mako Net, 1 image, Sep. 29, 2014.
OREQ Mambo Net, 1 image, Sep. 29, 2014.
OREQ Stinger Net, 1 image, Sep. 29, 2014.
Purity Red Baron Net, 1 image, Sep. 29, 2014.
Purity Skimmer Net, 1 image, Sep. 29, 2014.
Purity Ultra-Lite, 1 image, Sep. 29, 2014.
Aquapro Skimmer Net, 1 image, Sep. 29, 2014.
Leslie'S Skimmer Net, 2 images, Sep. 29, 2014.
Pool Pals Net, 2 images, Sep. 29, 2014.
Pool Pals Skimmer Net, 3 images, Sep. 29, 2014.
Skimlite Net, 11 images taken during Applicant's interview with the Examiner on Jul. 7, 2015.
Vortek Pool Products, 2016 online product catalog, Feb. 16, 2016.
Ocean Blue Water Products, 2016 online product catalog, Feb. 16, 2016.

* cited by examiner

FIG. 27 Triangular Profile

Fig. 28 Molded w/Triangular Profile

Fig. 29 Elliptical Profile

POOL CLEANING APPARATUS AND RELATED METHODS

CROSS-REFERENCE TO RELATED APPLICATIONS

This continuation-in-part application claims priority to U.S. patent application Ser. No. 13/193,188, filed on Jul. 28, 2011 and U.S. patent application Ser. No. 13/773,521, filed on Feb. 21, 2013, the disclosures of which are incorporated herein by reference in their entirety.

FIELD OF THE INVENTION

This invention relates to devices for cleaning swimming pools and similar things, and more specifically is directed to apparatus and methods involving a cleaning tool utilizing a frame with a net retained thereon by a retaining member, and the retaining member is formed from at least two different materials.

The disclosures of my previously-issued U.S. Pat. Nos. 5,473,786, 6,302,277, and 6,368,502 are incorporated by reference as if expressly stated herein.

BACKGROUND OF THE INVENTION

A wide variety of tools and processes have been developed to clean swimming pools and similar things (fountains, spas—both above and below ground, fish ponds, etc.), including and in addition to those described in my previously-issued U.S. Pat. Nos. 5,473,786 and 6,302,277. Among those devices and methods are devices that are commonly referred to as "leaf rakes". Commonly, leaf rakes utilize a modular approach in order to permit replacement of parts of the leaf rake that tend to wear out. Among such prior art modular devices are some of mine (the Piranha Net PA-500 and Stingray Net SR-400), and others such as Purity Red Baron. Devices such as these typically include a replaceable net sized and configured to fit a frame, a replaceable elongated clip that serves as a retaining means to hold the net to the frame and a contact edge or lip (or cleaning surface) that makes contact with the interior surfaces of a pool. Also commonly and also modularly, an attachment means is provided to attach the frame to a handle or pole.

The Leslie's Pro Rake is another type of leaf rake that utilizes a modular approach. Its retaining means is not an elongated clip, but a very rigid, collar-like element with a net means permanently attached thereto. The collar and net means are snapped over the mouth portion of the frame during assembly. The Leslie's Pro Rake has an additional component that snaps over the front portion of the collar and on which a cleaning surface makes contact with an interior pool surface. In addition, some models of the Leslie's Pro Rake have a flexible tip on the contact portion of the additional snapping portion.

Prior art attempts to permit modular assembly and/or disassembly have many shortcomings. Among other things, the elongated clip must be stiff enough to retain the net on the frame while at the same time being flexible enough to permit ease of assembly and disassembly. Since securely retaining the net on the frame is more often a greater concern, the resulting rigidity of the elongated clip/retaining means tends to compromise the ease of assembly, disassembly, and/or replacement of parts.

Further compromise associated with rigidity occurs in the performance of the leaf rake as it is used on various surfaces found in swimming pools, spas, fountains, and other water features. In pools that have hard surfaces such as plaster, Pebble Tec, and rock, the portions of the elongated clip that make contact with such surfaces tend to last longer and perform better when they are rigid. However, in pools that have soft and smooth surfaces such as vinyl, fiberglass, acrylic, and tile, the benefits of having rigid contact portions of the elongated clip are limited. Fiberglass, acrylic and tile surfaces are generally very smooth and even slippery; sometimes these surfaces are made with varying textures that reduce slippage by giving grip to a swimmer's feet. When cleaning very smooth and slippery surfaces, the rigid contact portions of a conventional elongated retaining clip tend to glide over such surfaces almost too easily and, as a result, some debris may escape cleaning by either sliding between the clip and the smooth surface or sliding around the leaf net itself. Said another way, such rigid contact edges can prevent those contact edges from conforming very well to the surface being cleaned—the edges may not be sufficiently flexible. When cleaning surfaces that have slip reducing textures, this problem may be compounded; very small debris such as sand may easily slide between the textured surface and the contact points of a rigid elongated clip because the rigidity does not allow the contact points to conform to the variations of the textured surfaces.

Furthermore, the liners of vinyl pools, both in-ground and above ground, often lay directly upon firm surfaces such as concrete, wood, or dirt. It is not uncommon for tiny objects such as very small rocks, granules of sand, or other debris to be caught between the vinyl liner and the firm surface upon which it lays, resulting in small bumps in the liner. Though often very small, such bumps are usually detectable when struck by the contact points of a rigid elongated retaining clip during cleaning. As a result, the smoothness of motion that contributes to ease of cleaning is reduced or compromised as the rigid contact points of the cleaning tool grind against the liner. Furthermore, the small rocks and debris beneath the vinyl liner are potential hazards to the integrity of the vinyl liner, especially if the liner above those rocks and debris is subject to repeated abrasion. In extreme cases, the integrity of the liner of a vinyl pool may ultimately be compromised to the point where a leak forms in the areas where heavy abrasion occurs (such as from repeated cleanings from a leaf rake).

Additionally, the contact points of elongated clips have many possible configurations, with each configuration having unique features that contribute to the effectiveness of the cleaning tool. The profiles of some elongated retaining clips are designed to actually scoop under targeted debris during cleaning by providing a smooth, ramping transition surface that urges targeted debris into the net. Such configurations are described in my U.S. Pat. No. 5,473,786. Other profiles (such as that found on the Purity Red Baron device) are limited in their ability to lift targeted debris. Whatever the configuration, the rigidity of the elongated clip remains a factor that limits effectiveness in cleaning on some surfaces, especially vinyl liners, fiberglass, acrylic, and tile for the reasons mentioned above.

On the other hand, however, these clip elements typically cannot be made from a material that is too flexible or soft, because such material may be too easily damaged and/or it may not provide the degree of stiffness and structural integrity that is sometimes needed and desired during the cleaning process (for example, to scrape accumulated debris from the bottom of a pool, or to effectively clean a large smooth area of the pool surface).

Moreover, the elongated retaining clips currently used on leaf rakes typically are made from a single plastic substance which is extruded from a single die. Plastic extrusion is a well-known manufacturing process by which molten plastic is forced through a die, the die being a steel plate with an opening shaped so that the plastic forced through that opening has a given desired profile. As the molten plastic passes through the die, it takes on the general yet enlarged shape of the opening's profile. The newly formed molten plastic is then pulled for a distance of several yards, being stretched, formed and cooled until it takes its intended shape.

These single-material retaining clips used on leaf rakes have the dilemma discussed above; they must be both rigid enough to retain a net on a frame while also being flexible enough to permit assembly, disassembly, and reassembly with replacement parts, and their contacting edges must similarly strike a balance between sufficient stiffness and sufficient flexibility. Those compromises result in similar compromises in the pool leaf rake's performance.

OBJECTS AND ADVANTAGES OF THE INVENTION

It is, therefore, one of the many objects of my invention to provide an improved tool for cleaning debris from swimming pools, including the combination of a frame means forming a mouth portion and a net means covering the mouth portion, with an elongated clip that serves as a retaining means for retaining the net means in operative relationship with the frame means. In the preferred embodiment, the retaining means is a single elongated clip comprised of two different material substances, each substance having its own rigidity characteristics, in order that the assembled device can provide both the desired rigidity for retaining the net on the frame along with a flexible/soft contact portion for improved cleaning of pool surfaces. Accordingly, for apparatus and methods that are focused on this objective, the portion of the retaining means that grips the frame means is rigid enough to hold the net means on the frame means, and the contact portion of the retaining means is relatively softer, soft enough to desirably conform to variations in pool surfaces and provide reduced abrasion to vinyl liners or similar surfaces during cleaning.

One of the many methods of creating such an improved tool (having a single elongated clip comprised of two different material substances) is by a process called coextrusion. Coextrusion is very similar to ordinary plastic extrusion. However, whereas ordinary extrusion involves forcing a single molten plastic substance through a die, coextrusion actually involves forcing two different molten plastic substances that are heated separately to pass together and adjacently through a single die. As the two substances meet in the die, they bond to each other and are subsequently pulled, stretched, formed and cooled as one single elongated piece. Coextrusion is accomplished with a variety of plastics such as ABS, Polypropylene or Polyethylene, and coextruded parts generally are a single piece of plastic comprised of two different material characteristics (such as rigidity and/or colors, etc.). Although coextrusion is apparently used in many other industries, it does not appear to have been used in connection with pool leaf rakes or similar devices.

Another object of my invention is to provide a tool similar to the aforementioned cleaning tool, in which the profile of the retaining means is generally U-shaped and comprised of two different materials, with each material having its own unique rigidity. Among other things, the less rigid portions of the retaining means are preferably located in distinct areas of the profile to allow additional flexibility in key areas of the retaining means in order to increase ease of assembly, disassembly, and reassembly of the cleaning tool.

An additional object of my invention is to provide tools similar to the aforementioned characters that are comprised of a frame means that forms a mouth portion, a net means covering the mouth portion of the frame means, a single retaining means made with two different material substances, each substance having its own unique rigidity, and the retaining means being available in a variety of configurations that have unique features which contribute to the effectiveness of the cleaning tool.

Yet another object of my invention is the provision of an improved tool for cleaning debris from swimming pools, including the combination of a frame means forming a mouth portion, a net means covering the mouth portion, and a retaining means that both holds the net on the frame and provides contact areas that contribute to the effectiveness of the cleaning tool. The component of the frame that forms the frame's mouth portion has a cross-sectional profile that may include angles, notches and/or corners. Preferably, interior surfaces of the elongated retaining clip interlockingly fit with the frame's angles, notches and corners to increase the clip's effectiveness in retaining the net on the frame. While some of the features that comprise the clip's interlocking surfaces may be made from a rigid material, other parts of the interlocking surfaces may be made from a second, more flexible material so that assembly, disassembly, and reassembly of interlocking components is easier. Such flexible material can provide other benefits, such as improving the effective "grip" of the retaining means holding the net in position on the frame member.

Still another object of my invention is to provide an improved tool for cleaning debris from swimming pools, including the combination of a frame means forming a mouth portion and a net means covering the mouth portion, with an elongated clip that serves as a retaining means for retaining the net means in operative relationship with the frame means. The retaining means is a single elongated clip comprised of at least two distinct portions made from different material substances, each substance having its own unique rigidity. There is a gripping portion that retains the net on the frame, and a contact portion that makes contact with a pool's surface and has features that contribute to the effectiveness of the cleaning tool. In an alternative embodiment, the two or more portions are formed separately and then interlocked with each other, or snapped together, glued, bonded, or otherwise affixed to one another to form a single, elongated clip. Still other embodiments can include one material layer covering all or most of another layer (for example, a stiff inner clip can be "coated" with a softer exterior layer, or a softer cover element snapped over or onto a supporting/gripping clip). In certain applications, it can even be desirable to reverse the relatively hard/soft materials (soft inside, hard outside) and/or to have discrete and differently performing sections or portions of a "single" contiguous layer enwrapping the tool's frame.

A further object of my invention is to provide tools similar to the aforementioned characters that are comprised of a frame means that forms a mouth portion, a net means covering that mouth portion, a single retaining means made with two different material substances, each substance having its own unique rigidity and corresponding gripping or cleaning function, and one or more additional portions formed separately and attached to the single retaining means. In an alternative embodiment, the one or more additional portions are glued, bonded, interlocked, snapped together or otherwise affixed to the single, elongated clip.

An additional object of my invention is to provide tools similar to the aforementioned characters that are comprised of a frame means that forms a mouth portion, a net means covering the mouth portion of the frame means, a single retaining means made with two different material substances, each substance having its own unique rigidity. Preferably, the retaining means is available in a variety of configurations that have unique features which help retain the net on the frame and contribute to the effectiveness of the cleaning tool. For aesthetic or other purposes, each different material substance of the clip element or retaining means can have its own distinct color. In instances where the material substances also have different rigidity and flexibility, the different colors can serve to identify those areas of rigidity and flexibility.

Still another object of my invention is the provision of a retaining means to be used on a cleaning tool that is coextruded or otherwise formed from more than two different materials simultaneously. Among other things, such assemblies may provide an even more precise control of the materials within the tool, such as having three or more material stiffnesses, weights, colors, etc.

Other objects and advantages of the invention will be apparent from the following specification and the accompanying drawings, which are for the purpose of illustration only.

BRIEF DESCRIPTION OF THE DRAWINGS

FIG. 20 illustrates certain embodiments of the invention, in which the "high" point C is in fact generally a "point" (rather than the front edge of a generally horizontal upper surface of the frame, across which the debris must travel after it reaches that "high" point C), and in which the debris path can actually begin a relatively immediate "decline"

(such as along a slope B-C in FIG. 20) at or shortly after reaching the highest point (in FIG. 20, the "highest" debris travel point is the B end of arrow A-B);

DETAILED DESCRIPTION

Referring now to the drawings, and particularly to FIGS. 1, 5a, 5b and 9, a preferred embodiment of a swimming pool cleaning tool 10 is shown including a preferred embodiment of an elongated retaining clip 11 holding a preferred net means 12 on a frame means 13, the net means preferably having anti-slip devices 33 to prevent its edges from slipping between the frame means and the retaining means. Preferably, the retaining means 11 is formed from two different material substances being simultaneously formed into a single piece. In the retaining means, one substance is preferably more rigid than the other. In a preferred embodiment, slots 30 can be cut into designated portions of the retaining means in order to help it conform to the shape of the mouth portion of the frame means. In a preferred embodiment, the two substances are coextruded plastics forming one single elongated retaining means. Preferably, the U-shaped portion 14 of the coextruded retaining means is made of a plastic material that is rigid enough to grip the frame 13 tightly and hold the net 12 onto said frame during normal use of the cleaning tool. The contact portion 15 of the retaining means that makes contact with the interior surface 17 of a pool during cleaning is preferably more flexible than the U-shaped portion 14 that retains the net on the frame. Persons of ordinary skill in the art will understand, however, that it may be advantageous to have a flexible U-shaped portion and rigid contact portion, and/or portions of each part that are rigid and/or flexible in order to accommodate a variety of surfaces to be cleaned and/or different sized and shaped frame means. Furthermore, persons of ordinary skill in the art will understand that the coextruded (multiple material) features of my current invention can easily be adapted and used to provide virtually any existing shape of pool leaf rake retaining means, as well as many or all future shapes.

Figures 5A, 5B, 6, 8D, 9:
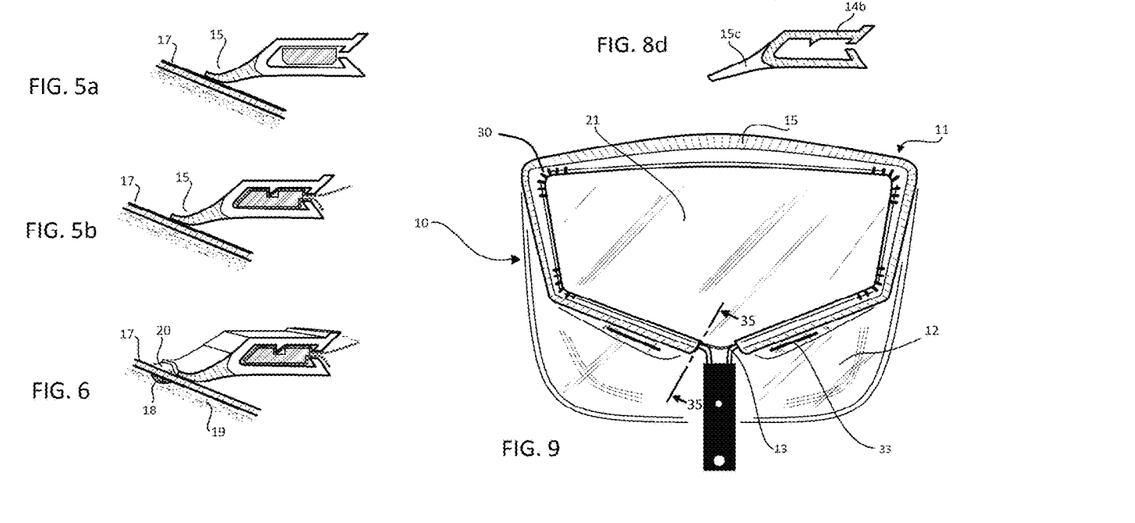
FIGS. 5a and 5b are profile views similar to FIGS. 3a and 4 (respectively), illustrating the embodiment making contact with the interior surface of a pool or other water feature, and further illustrating the sometimes desirable deformation of the contact edge that may occur upon the application of sufficient force by a user.
FIG. 6 is a foreshortened perspective/sectional profile view along line 35 of FIG. 9, showing the embodiment making contact with the interior surface of a pool or water feature, said surface having a variation in texture or other non-planar and/or non-smooth irregularity (such as a pebble or other debris)
FIG. 8d is a profile view of yet another alternative embodiment of my invention, illustrating the contact portion or edge of the retaining means as being formed from relatively more rigid material and the generally U-shaped or gripping portion of the retaining means as being formed from relatively more flexible material.
FIG. 9 is a plan view of a further embodiment of the invention, illustrating a retaining strip assembled with a frame means so that it helps hold a net means in a desired position with respect to the frame.

A flexible contact portion provides many advantages when compared to a rigid contact portion. Among the many benefits, a flexible contact portion 15 provides a smoother cleaning action over surfaces that may benefit from reduced abrasion. This is accomplished by way of the flexible contact portion bending, flexing and conforming to the shape/surface/texture of the surface to be cleaned. Therefore, when a flexible contact portion encounters an irregularity in the surface, it is able to conform to the shape of the irregularity without damaging the surface to be cleaned or the contact portion. For example, as shown in FIGS. 5a and 5b, the flexible contact portion 15 of a coextruded retaining means flexes as it makes contact with a pool surface 17. FIG. 6 shows how this flexing action is particularly helpful in reducing abrasion when the cleaning tool of the present invention is used in a vinyl pool that has small rocks or debris 18 caught between the vinyl liner 17 and the hard ground or other firm surface 19 upon which the vinyl liner lays. In such cases, the flexible contact portion 15 can conform to the variations in the vinyl's surface 20, allowing smoother cleaning action and reduced abrasion on the vinyl liner. These features benefit smooth pool surfaces with slip reducing textures in a similar way.

Figures 1, 1A, 2A, 2B, 2C, 2D, 2E, 2F, 2G, 2H, 2I, 2J, 2K, 10A, 10B, 10C, 10D, 10E:
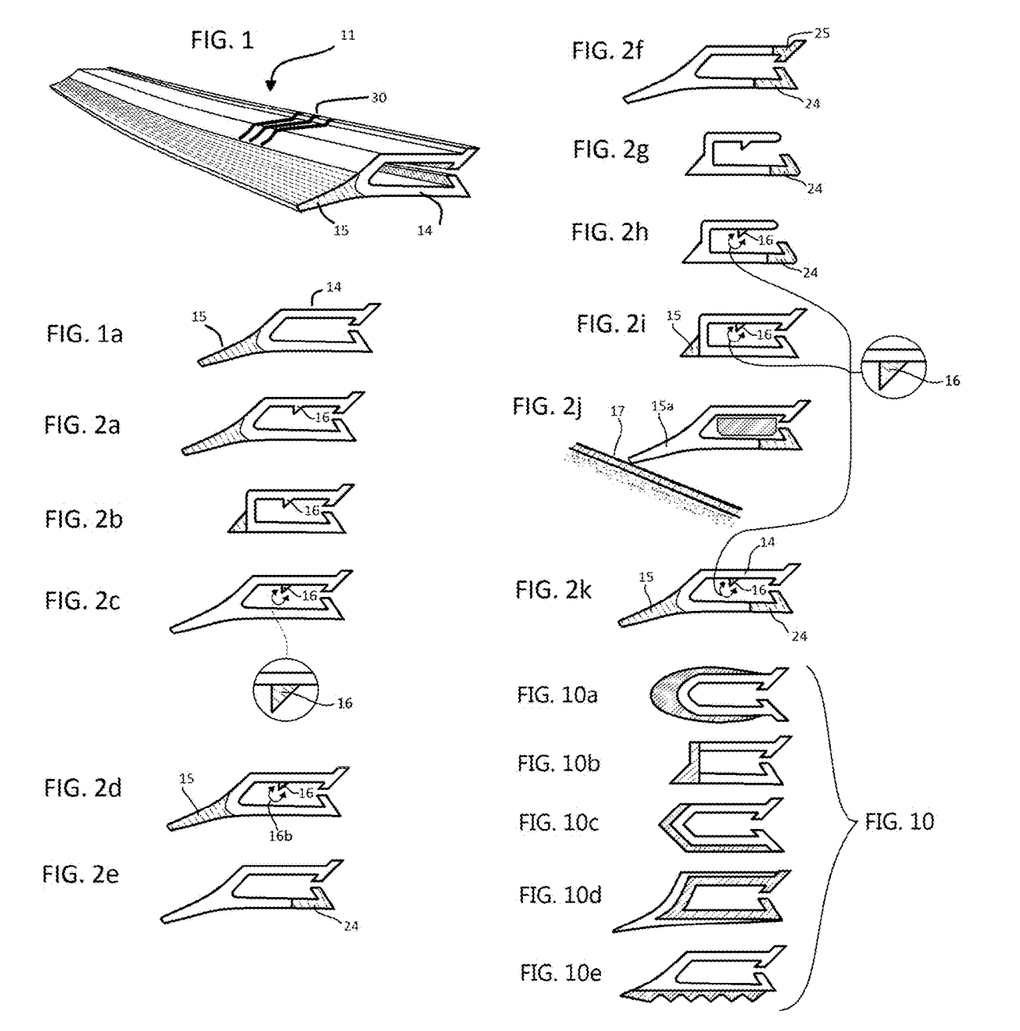
FIG. 1 is a perspective view of a preferred embodiment of the elongated retaining means made in accordance with the teachings of the invention, prior to assembly with a frame and/or other elements.
FIG. 1a is a profile view of FIG. 1.
FIGS. 2a, 2b, 2c, 2d, 2e, 2f, 2g, 2h, 2i, and 2k are profile views similar to FIG. 1a, illustrating some of the many other alternative embodiments of the retaining means of FIG. 1.
FIG. 2j is a profile view similar to FIG. 2e, showing yet another embodiment of the invention, with the retaining means cooperatively assembled with a frame member, and the retaining means contacting the interior surface of a swimming pool or other water feature.
FIG. 10a is a profile view of a retaining means having a rigid U-shaped gripping portion within a flexible outer portion.
FIG. 10b is a profile view showing the two rigid legs of a retaining means' U-shaped gripping portion joined by a flexible contact portion.
FIG. 10c is a profile view of an alternative embodiment of a retaining means, wherein the U-shaped gripping portion has adjacent contact portions partially surrounding said gripping portion.
FIG. 10d is a profile view of a retaining means made up of an outer, contact portion formed from rigid plastic, and an inner, gripping portion made from plastic that is more flexible than the outer portion.
FIG. 10e is a profile view of retaining means that has a rigid U-shaped gripping portion to grip a net on a frame, and an adjacent flexible contact portion with teeth-like ridges that enhance scrubbing or cleaning.

As mentioned above, a variety of shapes of elongated retaining means can be useful on pool leaf rakes and may depend upon, among other things, consumer preferences. Whereas some are designed to actually scoop under targeted debris during cleaning and have a smooth, ramping transition surface that urges the targeted debris into the net in a manner consistent with my U.S. Pat. No. 5,473,786, others have more blunt contact portions and do relatively little lifting of debris. As also mentioned above, the coextruded features of my current invention can easily be adapted and used on all such designs. FIGS. 1a and 9 illustrate a retaining means that has a U-shaped portion 14 for gripping and retaining a net on a frame, said U-shaped portion being made from a rigid plastic. Coextruded with this rigid U-shaped portion is a flexible contact portion 15 designed to lift debris with a smooth transition surface and direct the debris through the mouth portion 21 of a cleaning tool's frame 13 and into the tool's net portion 12.

Figure 3A:
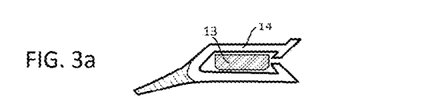
FIGS. 3a and 3b are cross-sectional profile views similar to FIGS. 1a and 2a, showing the retaining means assembled around a portion of a frame means that preferably helps form an opening to receive debris during use of the invention.

Some manufacturers and consumers prefer modular designs that use retaining means that require the least amount of effort during assembly, disassembly, or reassembly on a frame element. Although the invention can be practiced in many other embodiments that do not focus on this element or feature, FIG. 3a illustrates how a U-shaped portion 14 of the retaining means preferably can be easily snapped around a frame 13.

Figure 3B:
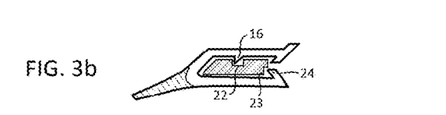
Figure 4:
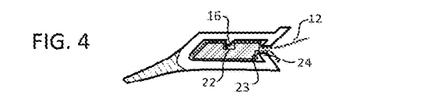
FIG. 4 is a sectional view along line 35 of FIG. 9, illustrating the invention assembled with a frame means and retaining the edge of a net element with respect to the frame.

Other manufacturers and consumers prefer modular retaining means that are somewhat more complicated (but arguably provide a more secure assembly or some other perceived benefit). Among other approaches, these can have cooperating/interlocking elements on the retaining means and/or the frame, such as one or more angles, notches, and/or corners. Examples of some of the many such profiles are shown in FIGS. 2a and 2b, illustrating the addition of an interior tooth or detent 16. As shown in FIGS. 3b, and 4, this tooth preferably interlocks with a corresponding groove 22 that can be provided along the length of some or all of the frame element (such as the part that forms the mouth portion). Among other things, such interfitting elements can provide added extra friction to the assembled parts, to even better ensure that net portion 12 will not slip off of or become disengaged from the tool.

Persons of ordinary skill in the art will understand that the size, shape, location, orientation, and/or number of such cooperating elements can be modified depending on the application and a number of factors. For example, one or more additional shapes (such as notch 23 at the corner of the frame (see FIG. 4)) can provide a rear "locking" location to help retain the net in its desired relationship in the assembly. Although the drawings generally illustrate female engagement elements on the frame members and corresponding male engagement elements on the retaining means, persons of ordinary skill in the art will understand that the male/female orientations can be reversed, that any such "female" element on the retaining means might be formed from a material different from other parts of the retaining member, and that (in certain applications) the frame itself might be formed from multiple different plastic or other materials so that (for example) a male portion or element of the frame might have different color or material characteristics than other parts of the frame.

While interlocking features may help prevent the net portion from slipping off the frame, they correspondingly make assembly, disassembly and reassembly of the swimming pool cleaning tool more difficult. In certain embodiments of the present invention, however, various portions of the retaining means can be formed from different materials, each having its own material properties (such as flexibility, etc.). For example, by using a coextruding process or other suitable method of manufacture, some or all of those interlocking features of the retaining means can be formed from a relatively more flexible material, which can make assembly, disassembly, and reassembly of parts easier while still providing a sufficient or desirable level of increased "gripping" and retention of the net. Thus, in the example of FIG. 2c, the entire profile of the retaining means is formed with rigid plastic except that the interior tooth 16 is formed with a more flexible plastic or similar material. In this embodiment, the flexible tooth can more easily bend during assembly, disassembly and reassembly (as compared to embodiments in which the tooth is formed from the same stiffer material as the rest of the retaining means), while still adding a desired amount of friction to help retain the net on the frame when the entire cleaning tool is assembled and/or in use.

Figure 7:
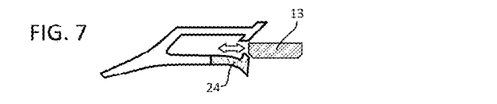
FIG. 7 is a profile view of another embodiment of the elongated retaining means of the invention adjacent a frame member or element, illustrating one of the many methods of assembly and disassembly with that frame member/means.

Persons of ordinary skill in the art will understand that, although many of the drawings illustrate the use of two different materials within the retaining means element and show those materials as being in single contiguous portions of the retaining means, the invention can be practiced in a wide variety of other ways, including for example using more than two such different materials, and/or using the same material at two or more different, non-contiguous locations within the cross-section of the retaining member. As previously discussed, such embodiments can provide benefits such as easing the assembly, disassembly, and reassembly of the retaining member onto a frame element. For example, FIG. 2e shows one of the preferred embodiments wherein the entire profile of a retaining means is formed from relatively rigid plastic (or other suitable material) while a rear interlocking portion 24 is formed from relatively more flexible plastic (or other suitable material). FIG. 2j illustrates another embodiment wherein the more rigid contact portion 15a of FIG. 2e has little or no flex or deformation when pressed against a pool's surface. FIG. 7 shows how the flexibility of the rear portion 24 will enable the frame 13 to pass in and out of the retaining means more easily during assembly and reassembly. FIG. 2g is similar to FIG. 2e, but demonstrates how a flexible rear portion 24 may be coextruded on a retaining means that is blunt with little ability to lift debris and/or designed to fit interlockingly with a frame. FIG. 2f is similar to FIG. 2e but has an additional side of the U-shaped portion formed with flexible material for the purpose of creating even greater ease of assembly, disassembly, and reassembly of the cleaning tool. As indicated above, persons of ordinary skill in the art will appreciate that the possibilities for interlocking assemblies/configurations are limitless, and not limited to those examples discussed herein.

Figure 3C:
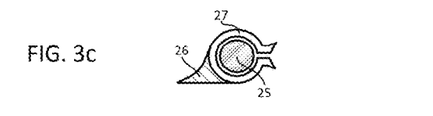
FIG. 3c is a profile view similar to FIGS. 3a and 3b, but illustrates another of the many alternative embodiments of the invention as it might be used on a non-rectangular or rounded rod frame member or frame portion.

Some manufacturers and consumers use pool leaf rake frames that employ a frame with some cross section other than a rectangle (for example, a rod). FIG. 3c shows how a retaining means that fits the circular profile of a rod 25 can have a coextruded portion 26 formed adjacent to a rigid portion 27 that holds a net in place on the frame means.

There are further instances where multiple coextruded features may be useful and/or desired. For example, FIG. 2h illustrates how the use of a flexible interlocking tooth 16 can be combined with a flexible rear portion 24 of the U-shaped portion of the retaining means, thus allowing an interlocking frame to be even more easily assembled, disassembled, and reassembled than the profile shown in FIG. 2g. And while FIGS. 2d and 2i illustrate configurations having both a flexible tooth 16 and a flexible contact portion 15, further advantages are provided in configurations such as illustrated in FIG. 2k, which shows a rigid U-shaped portion 14 that grips a frame combined with a flexible contact portion 15, a flexible tooth 16, and a flexible rear portion 24, all culminating in an interlocking retaining means that provides reduced abrasion at contact with even potentially greater ease of assembly, disassembly, and reassembly of parts.

Figure 8A:
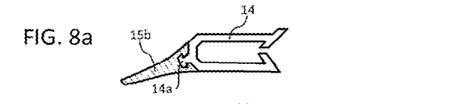
FIGS. 8a, 8b, and 8c are profile views of still further alternative embodiments of the invention.

Persons of ordinary skill in the art will understand that while coextrusion is the preferred method of creating a single retaining means from more than two different materials simultaneously, it is possible to provide a retaining means which is formed from separate parts that are keyed to each other or otherwise fitted together. For example, in FIG. 8a, the U-shaped portion 14 of the retaining means preferably is formed as a single, separate part, and has attachment means or key 14a formed adjacent to the area where the retaining means normally will make contact with a pool's surface during use. A separate and attachable contact portion 15b, also preferably formed as a single, separate part, has one or more keyed or mating features in its design, that allow it to be fitted and/or otherwise affixed, through a snapping feature, glue, or any other bonding means, to the keyed/attachment means 14a of said U-shaped portion 14. In certain embodiments, the separate and attachable contact portion 15b may be removable and replaceable.

Figure 8B:
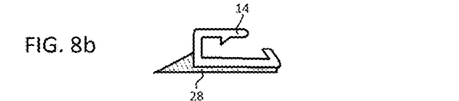
Figure 8C:
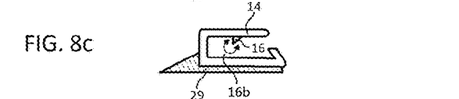

Persons of ordinary skill in the art will appreciate that the invention can be practiced using any suitable materials and methods of manufacture and assembly. For example, there are many possible variations in which a single retaining means can be made from two or more parts of different materials. FIG. 8b represents merely one of many options in which the U-shaped portion made from one material can have bonded to it a secondary portion 28 formed of a different material. Further options include bonding or attaching a secondary or even tertiary part to an already coextruded retaining means. FIG. 8c shows the profile of a single retaining means having a rigid U-shaped portion 14 that is coextruded with a flexible interlocking tooth 16, said single retaining means having an additional part 29 bonded or attached to it. FIG. 8d shows yet another embodiment of a single coextruded retaining means that has a flexible U-shaped portion 14b and a rigid contact surface 15c. The two portions 14b and 15c in FIG. 8d can also be made separately and bonded or attached to each other through some means other than coextrusion.

Furthermore, in one embodiment, a method of cleaning an object such as the surface of a pool or the like is provided. The method may include some or all of the steps of: 1) identifying objects to be cleaned from the pool (i.e. leaves, twigs, or other debris) since debris may be floating on the pool's surface, suspended in the water, or laying on the bottom surfaces (pool bottom, steps, seats, etc.); 2) cleaning surface debris by a) trapping it against the pool's surface with the mouth portion of the tool, b) skimming the surface with the tool in such a way that part of the frame's mouth is submerged in the water while a remaining portion of the frame's mouth is above the surface, or c) approaching the debris with the tool below the water's surface and scooping the debris while lifting the tool out of the water; 3) cleaning suspended debris by moving the tool towards in such a way that the debris gets caught in the tool's mouth portion and is forced into the net; and 4) cleaning debris from the pool's bottom surfaces by a) laying the tool on the bottom surface in such a way that the contact portion of the retaining means is pointed at targeted debris, b) pushing the tool along the bottom until the contact portion of the retaining means raises the debris from the bottom, and c) continue pushing the tool until the debris is caught in the net portion of the tool.

In an alternative embodiment, a method of cleaning may include providing a cleaning tool such as the one described herein. Preferably, the contact portion of the cleaning tool makes sufficient contact with the surface of the object to be cleaned, such that the tool can easily slide along the surface and catch debris which is removed from the surface by the contact portion. Persons of ordinary skill in the art will understand that a wide range of methods associated with the present invention are possible, including but not limited to methods of manufacturing and methods of assembling a cleaning tool such as the one described herein.

In another embodiment, a method of assembling the device described herein is provided. This method may include some or all of the steps of: 1) providing a frame, a net and a retaining means; 2) holding the frame in such a way that the net can be placed over the frame's mouth portion; 3) holding the net in place with the frame to prepare it for assembly with the frame; 4) folding the edges of the nets mouth over the frame's mouth; 5) affixing the net's anti-slip means (i.e. Velcro) into proper position, with the edges of the net positioned to wrap around the mouth portion of the frame; 6) while holding the net on the frame, snap the retaining means over the frame so that the edges of the net will wrap around the frame as the frame passes into the gripping portion of the retaining means; 7) continue this process around the frame until the entire retaining means is snapped onto the frame and is holding the entire mouth portion of the net around the entire mouth portion of the frame (save the small areas adjacent to the tubular attachment means that ultimately lay between the ends of the mounted retaining means); and 8) ensure that the retaining means is completely snapped onto the frame and any interlocking portions of the retaining means and the frame are seated properly.

In yet another embodiment, a method of disassembling the device described herein is provided in order to allow for replacement of parts. The method may include some or all of the steps of: 1) gripping the rear ends of the U-shaped portion of the retaining means in a way that spreads the legs of the U-shaped portion apart; 2) releasing anti-slip means on the net (if any, and if net removal is desired); 3) pulling the retaining means away from the frame and, where necessary, continue to spread areas of the U-shaped portion of the retaining means that do not readily disengage from the frame; and 4) removing and replacing the net if desired.

In still another embodiment, a method of manufacturing the device described herein is provided. The method may include some or all of the steps of: 1) determining which materials of differing properties are compatible with each other for coextrusion and suitable for a retaining means that must grip a net on a frame and make contact with a pool's surface during cleaning; and 2) mixing, loading, heating, and extruding the designated differing materials together through a die in a manner consistent with coextrusion so that the designated differing materials form a retaining means having a profile composed of a) a U-shaped portion for gripping a net on the frame of a tool for cleaning swimming pools, and b) a contact portion for making contact with a pool's surface when mounted on a tool used to clean swimming pools.

A preferred method of manufacturing the retaining means with a U-shaped portion and contact portion of different material substances includes coextrusion. Persons of ordinary skill in the art will appreciate, however, that the U-shaped portion and contact portion may be joined together by some other process such as bonding with glue or a similar adhesive substance, or the formation of two extrusions (such as tabs) that snap/lock together.

As indicated above, the shape and size and materials used for the various components of the invention can vary widely, depending on the specific application for which the invention may be intended and other factors (costs, weight, etc.). For example, FIGS. 10a-10e illustrate some of the many alternative embodiments of the retaining means of the invention having varying sized and shaped contact portions and U-shaped portions. For certain applications (for example spas), the shape and/or size of the frame and/or assembly may need to be relatively smaller and lighter than embodiments used on swimming pools. Likewise, such applications may use frame elements that are NOT removable from relatively shorter handles or poles (as compared to conventional removable, telescoping poles used when cleaning swimming pools).

Persons of ordinary skill in the art will understand that various method steps to assemble these and other alternative embodiments, and the method steps by which the invention may be used in such applications, may vary somewhat but still be within the scope of the invention. Among other things, once the cleaning apparatus has been assembled (or if it is already assembled and/or non-modular), the tool preferably can be used in a number of ways, including many that are useful for cleaning pools, spas, or other things. Various parts of the apparatus (such as the roughened/serrated surface(s) of the tool, etc.) can be manipulated by a user to scrape or loosen debris. The contact edge can function, among other things, as a "squeegee" when cleaning a surface (although the surface may in fact be underwater).

Many of the embodiments discussed above are directed to a retaining means that incorporates at least two elements having different material properties (i.e. one soft, the other firm; different colors, etc.). Among the benefits of such embodiments is that they can provide a soft contact portion that is gentle on vinyl or fiberglass or other pool surfaces, while also having structural or supporting properties in the other material that aid in the use and functionality of those embodiments. More broadly, many embodiments of the invention can be additionally modular in design, with the frame portion being aluminum, the retaining means being its own separate part, and the net means being replaceable and retained on the frame by the retaining means.

Other embodiments of the present invention, however, are not limited to tools made from multiple components. Such other embodiments include those that are not modular in design (and/or are of a lesser or different degree of modularity). For example, the tool's frame, scooping/contact surface, net made from fabric, and even the tubular attachment means for attaching the tool to a pole all can be fabricated as one single part. In other words, the manufacturing process can fabricate or mold all and/or at least some of the various elements together as part of the same process, reducing and/or eliminating the modularity aspect of those embodiments. Depending on the application to which the invention is to be put, as well as other factors (economics, etc.), certain embodiments may be more desirable than others.

Such non-modular (and/or less modular) embodiments can include a soft contact surface such a described herein. That contact surface can be included in such embodiments in any suitable manner, including by way of example by being incorporated into, attached/molded onto, and/or affixed to other elements of the apparatus. Persons of ordinary skill in the art will understand that such non/less modular embodiments can provide some or even all the same advantages of material properties (softness, hardness, color differences, etc.) as with the embodiments that use extruded, modular designs.

Figure 11:
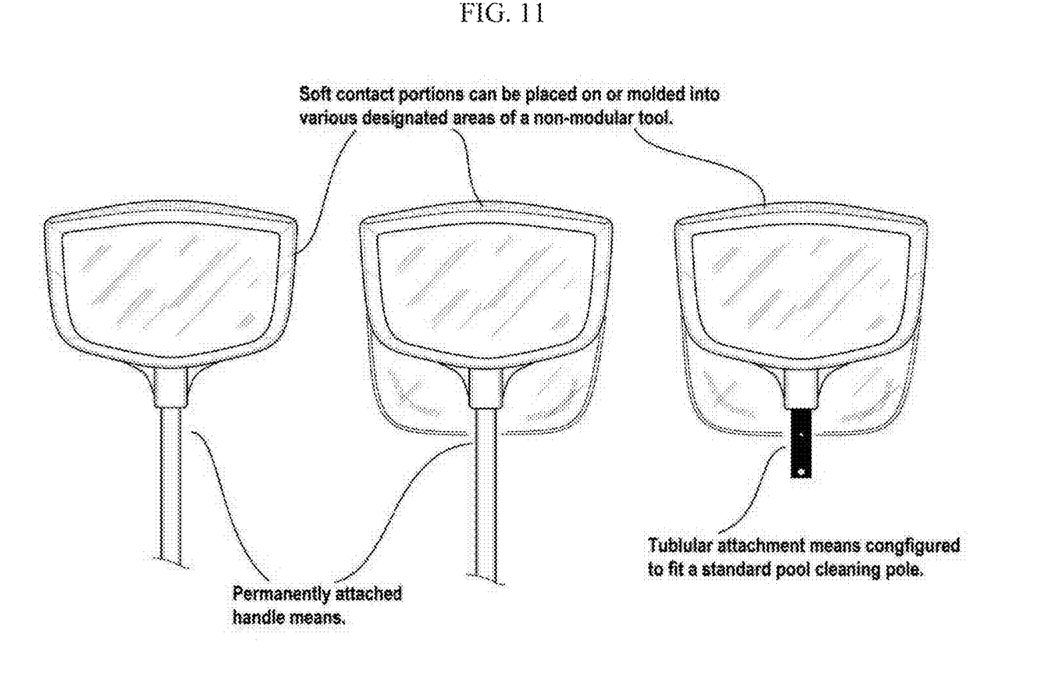
FIG. 11 illustrates plan views of three of the many examples of non-modular and/or less modular embodiments that can have contact portions made from two or more plastics of different material properties.

Just a few examples of such non-modular and/or less modular embodiments that can have contact portions made from two or more plastics of different material properties are shown in FIG. 11.

Figure 12:
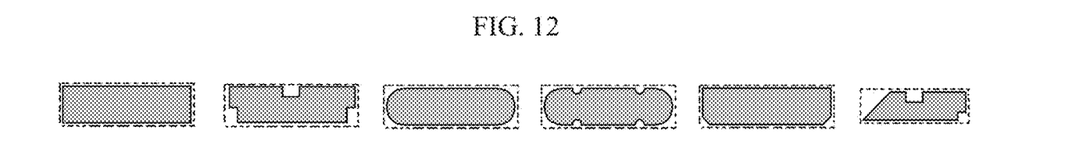
FIG. 12 illustrates some of the basic rectangular cross-section shapes or frame profiles that currently are available on the market.

Another issue with prior art devices is that typically the frames have profiles or cross-sections that correspond to two primary shapes: (1) rectangles (most prior art); and (2) circles (these include, for example, frames fabricated by bending a round metal rod). FIG. 12 illustrates some of those basic rectangular cross-section shapes that currently are available on the market. As shown, although they vary somewhat (corners are trimmed, rounded, shaved, etc.), the cross-sections are all basically rectangular.

Figure 13:
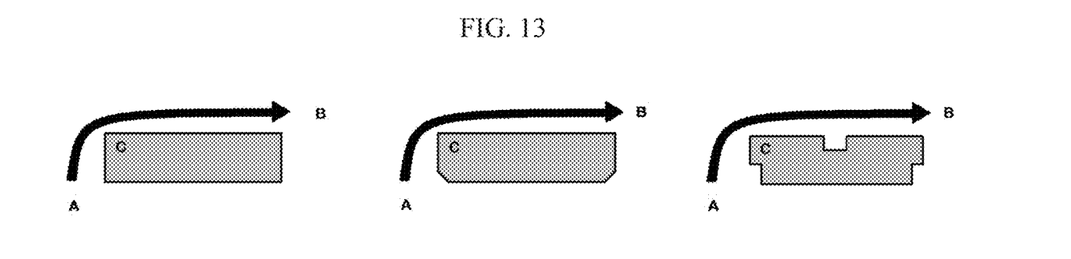
FIG. 13 shows a typical path that debris travels during use of a prior art frame having a generally rectangular cross-section.

While such rectangular cross-sections have some benefits (e.g., good strength-to-weight ratios, preventing the corresponding retaining element from undesirably twisting or rotating about the longitudinal axis of the frame), they also have shortcomings. These include, by way of example, a) assembly/disassembly are difficult, and b) successfully scooping targeted debris from a swimming pool depends upon getting that debris "up and over" the leading edge of the rectangular frame bar, and then into the bag element of the apparatus. This is illustrated in FIG. 13, which shows that, regardless of the specific details of any particular "rectangular cross section" frame, the debris has to travel a path at least generally similar to that shown by the arrows in that drawings. Persons of ordinary skill in the art will understand that, in FIG. 13, the debris originally is on the left of each of the example frames, and the respective frame is traveling from right to left during a cleaning stroke. Thus, as the debris passes along the path of the respective arrow (from A to B, outside the tool INTO the bag element of the tool), the debris has to clear the "top" or uppermost surface of the frame (C).

Figure 14:
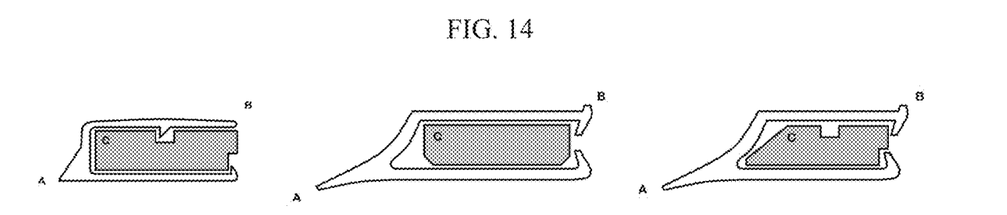
FIG. 14 shows examples of prior art assemblies based on a generally rectangular cross section frame and mating channel in a retaining clip member.

As mentioned above, such "rectangular cross section" frames also can be difficult to work with during assembly/ disassembly. In many devices, and as illustrated in FIG. 14, the retaining clip that fits around the frame is intentionally designed to grip the frame element securely (to prevent inadvertent dislodgement from the frame). This desired secure engagement, however, correspondingly makes it difficult to disengage the retaining clip from the frame for necessary tool maintenance, repair, or the like. Persons of ordinary skill in the art will understand that, in such embodiments, the retaining clip tends to "hang up" on the right edges of the frame (see FIG. 14) during disassembly. In other words, the retaining clip needs to 'grab' the frame sufficiently to stay engaged during the tool's use, and the 'teeth' don't want to let go of an angular frame. Said another way, to the extent that the teeth can be easily disengaged from the frame, they risk coming disengaged during use of the tool and reducing or eliminating the tool's utility.

Figure 15:
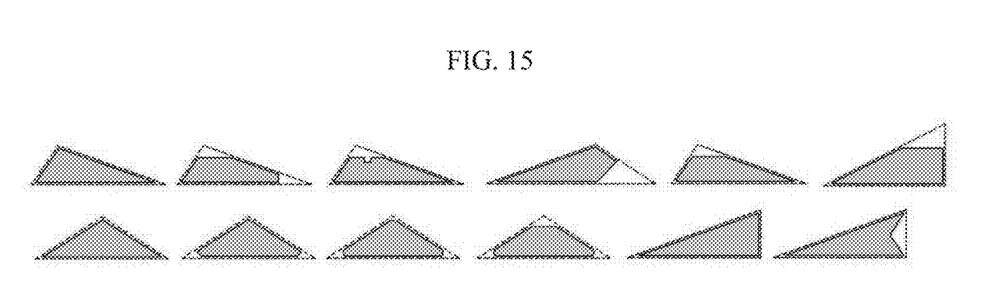
FIG. 15 shows examples of modified frames that are generally defined by a triangle.

Thus, additional objects of my invention are to a) to modify and/or remove point C from the frame/tool's cross-sectional profile, and/or b) make a tool that is easier to assemble/disassemble due to its retaining clip's ability to more easily receive/release the frame element (while still maintaining a desired degree of secure grip during use of the assembled tool/apparatus). One way to do this is to use a cross-section or profile for the frame that is NOT generally configured as a rectangle or circle. Some of the many examples of such modified frames are illustrated in FIG. 15, in which a variety of frame profiles generally describe or define a triangle.

Shapes such as triangles offer a virtually unlimited range of specific shapes and sizes of cross-sections, any of which can provide relatively easier assembly and disassembly of the clip with the frame. Among other things, such shapes do not have a "blunt" side that can be difficult to press into a retaining clip during assembly, and/or can get caught on the retaining clip during disassembly (the "blunt" surface that typically may be most relevant to difficult disassembly is the right side of the "rectangle" shape shown in the drawings). Depending on the configuration, they can modify and/or effectively eliminate point C, and can also provide a relatively straight and/or smooth line of travel for debris as it moves towards the net along the paths A to B.

Figure 16:
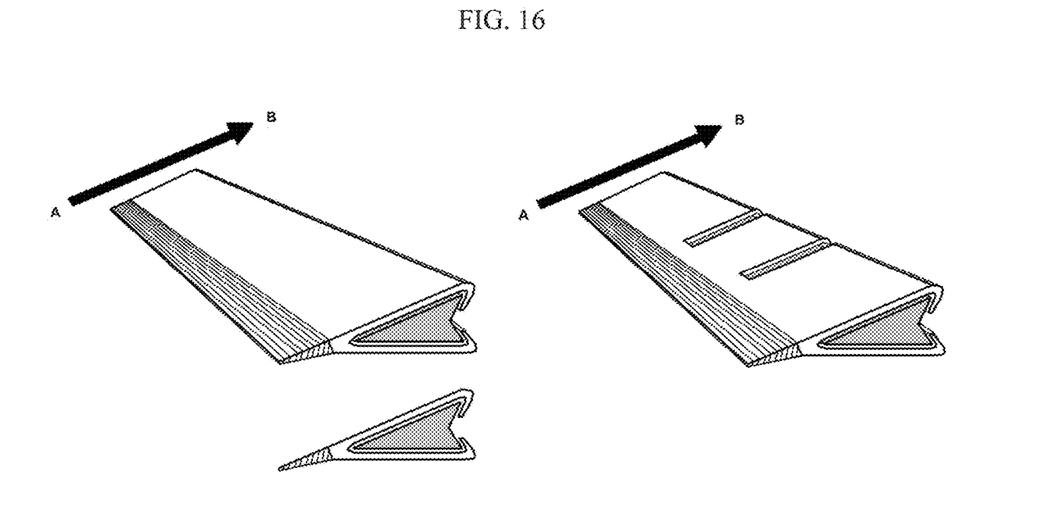
FIG. 16 illustrates how one or more generally transverse slots can be cut at appropriate locations along the length of the retaining clip to help the clip be more easily bent to match the longitudinal shape of the frame's mouth portion.

The corresponding retaining clips can be fabricated from any suitable material and from any suitable method of fabrication. Among other things, they can be formed in standard, single-material extrusions or in a coextrusion or more complex form. To help the clip be more easily bent to match the longitudinal shape of the frame's mouth portion (so that those pieces can be more easily assembled together), one or more generally transverse slots can be cut at appropriate locations along the length of the retaining clip, as shown in FIG. 16 (right-most perspective view shows the presence of slots that have been formed or cut into the retaining clip).

Figure 17:
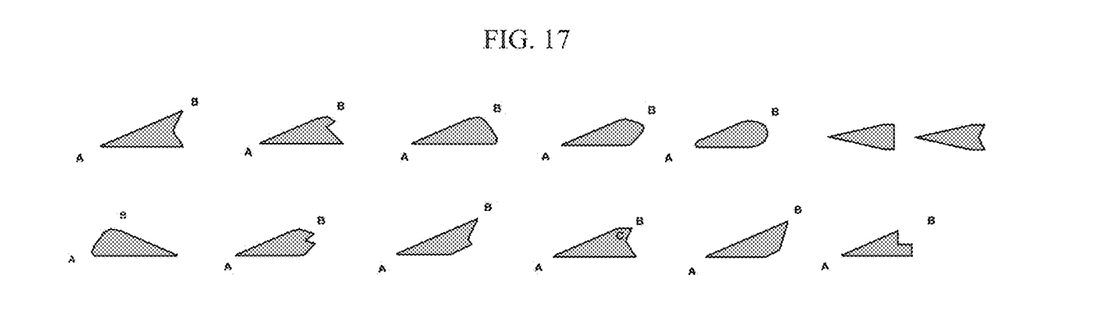
FIG. 17 illustrates still more of the various frame cross-sections with which retaining clips may be engaged to practice the invention.
Figure 18:
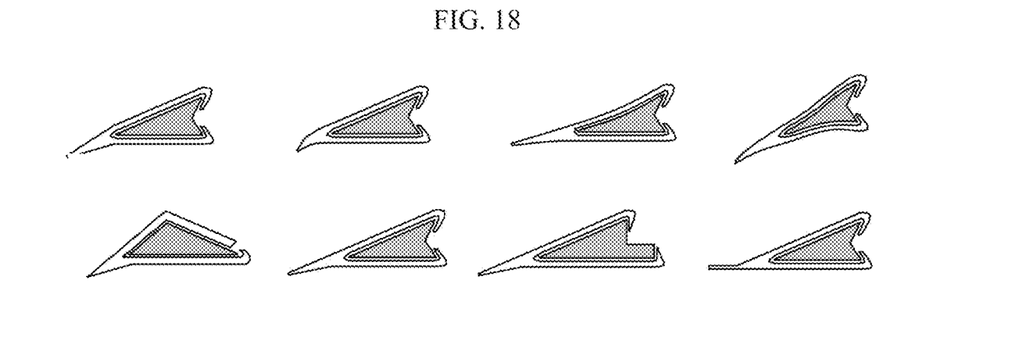
FIG. 18 shows more examples of embodiments of the inventions with clip elements assembled onto frames.

Persons of ordinary skill in the art will understand that the variety of cross-sectional shapes for the retaining clips is virtually unlimited. Preferably all such embodiments are configured with a cross section that securely engages with the particular frame member being used, but otherwise the precise shapes for both the interior portion of the cross-section (the part that at least generally contacts the frame member) and the exterior portion of the cross-section (those surfaces that remain visible after the clip and frame are assembled together) can be any of a broad range. FIG. 17 illustrates still more of the various frame cross-sections with which such retaining clips may be engaged, and FIG. 18 shows more examples of embodiments of the inventions with clip elements assembled onto frames. Persons of ordinary skill in the art will understand that, in some embodiments, the specific cross-sectional shape at any given point along the tool's rim/mouth may include a portion of generally horizontal "upper" and/or "lower" surface (similar to some degree to the "upper" and/or "lower" surface of some of the prior art "rectangular" cross-sections mentioned above) so long as the overall profile generally defines a triangle or some other non-rectangular, non-circular configuration that provides one or more of the benefits of the invention.

Thus, the precise shape of both the retaining means and the frame means can vary greatly.

Figure 19:
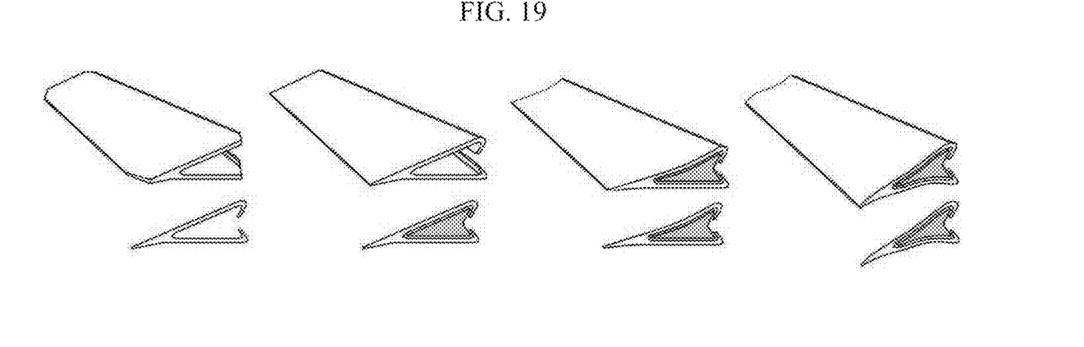
FIG. 19 shows a series of perspective views of various exemplary assembled frames and clip elements, and under each perspective view is a corresponding end view of same.

In the embodiments of FIG. 19, the leftmost drawing is the same as the drawing that is second from the left, except that the leftmost drawing illustrates one of the many ways in which the normally sharp/pointed corners (the three points in the foreground that define the extremities of the clip element) have been cut or otherwise modified. In certain embodiments, conventional sharp/pointed corners (such as in the embodiment that is second from the left) can gouge or even scratch a user's hands if the user is not sufficiently careful. Modifications to reduce or eliminate these "points" can be a wide variety of shapes and can be accomplished by any suitable method (including molding, cutting, grinding, melting, sanding, etc.). Although the leftmost embodiment shows a generally angled final shape (rather than a 90 degree corner as in the second from left embodiment, the leftmost splits that angle into at least two pieces −45 degrees each or some other combination that collectively traverses the necessary angle).

Preferably, a generally triangular frame allows for a longer and/or more gradual transition surface (the scooping surface of the tool) than is possible with prior art frames that are generally rectangular. In other words, preferably point "C" (the uppermost "height" that debris must clear to then make it into the net/bag of the invention) is relatively much further to the right on the frame element.

Figure 20:
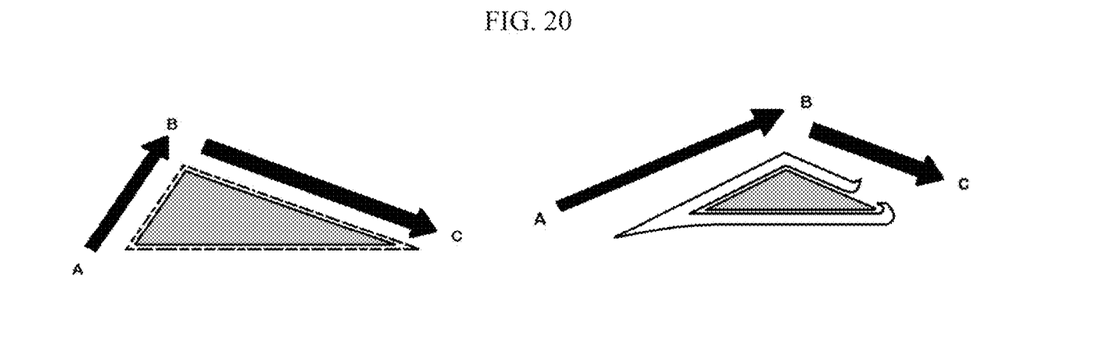

In addition, in certain embodiments of the invention, the "high" point C is in fact generally a "point" (rather than the front edge of a generally horizontal upper surface of the frame, across which the debris must travel after it reaches that "high" point C). In such embodiments, the debris path can actually begin a relatively immediate "decline" (such as along a slope B-C in FIG. 20) at or shortly after reaching the highest point (in FIG. 20, the "highest" travel point is the B end of arrow A-B). Among other things, this helps ensure that debris (especially heavy or difficult-to-remove debris such as rocks, coins, BB's, etc.) will more easily be moved into the actual "net" portion of the tool and that such debris will not inadvertently roll or move back "out" of the net (such as might happen if the user's cleaning stroke stopped with such debris perched on the prior art "horizontal" surface). In other words, the "high point" of the cross-section of such embodiments of the invention can serve as a barrier or ledge to help reduce the possibility that debris, once scooped up to at least the highest cross-sectional point, might subsequently exit the tool and have to be re-scooped by the user in a subsequent stroke. Referring again to the example in FIG. 20, once the debris clears point B, it preferably will travel "downhill" towards the net (in this case, the exposed net begins at point C). Depending on the orientation of the tool, gravity preferably will also aid in urging the debris "down" into the net portion/element of the apparatus.

Persons of ordinary skill in the art will understand that, among other benefits of the invention, certain embodiments can reduce the amount of frame material and resulting weight of the apparatus, therefore making the assembled tool easier to use than tools having conventional "rectangular cross-section" frames. Such person further will understand that other embodiments of the invention can use "conventional" or even prior art rectangular frames and still provide a similar or even identical outer contour (one having an effective high "point" rather than an extended somewhat horizontal upper surface), such as by forming the clip's outer shape to match that outer shape shown in the rightmost drawing in FIG. 20, while also forming the clip's interior shape to mate and engage with that conventional rectangular cross-sectioned frame element. Persons of ordinary skill in the art will also understand, however, that such embodiments would not provide at least some of the otherwise desirable benefits of other embodiments of the invention, such as relatively easier assembly/disassembly of the frame and clip from each other.

In many embodiments, the 'legs' of the retaining means preferably are relatively stiff, to provide the retaining means with a desirably "tight" grip around the frame means, to maintain engagement between those parts. Frame embodiments that include a "sloping" (rather than blunt") leading edge in cross-section (such as illustrated in many of the present drawings on the "left" side of the cross-section) preferably facilitate easier assembly of the frame into the retaining clip because that gradual wedge/slope spreads or forces the retaining clip legs apart as the two pieces are pressed toward each other.

In addition, the "downhill" side of the frame (in the attached drawings, the "right" side) preferably also can assist during assembly because it preferably enables the stiff 'legs' to pinch the frame in such a way that they urge the frame further or more strongly into the generally U-shaped web of the retaining means. The same preferably is true during disassembly: the stiff "legs" of the retaining means gradually open as the frame slides out of the retaining means and then pinch the frame so that it slides out of the retaining means (kind of like how pinching a watermelon seed forces it to shoot out from between your fingers). For embodiments having little or no constant horizontal thickness (instead having a "point" at which the frame thickness is at a maximum), the legs do not have to remain spread for such a long period of time—they only have to be at their maximum spread position for a relatively short time/distance during removal of the frame from the retaining means.

Figure 21:
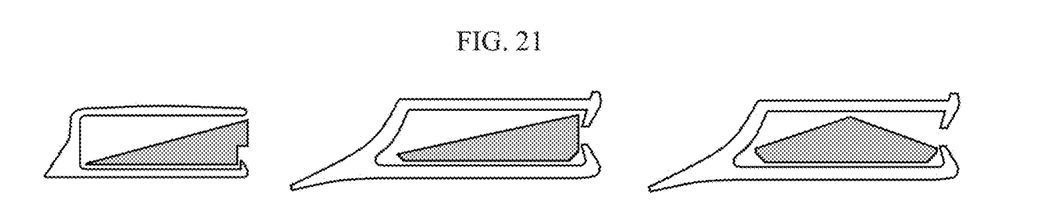
FIG. 21 shows just three of the many embodiments in which a modified frame cross-section of the invention preferably can be beneficially used with prior art retaining means.

As illustrated in FIG. 21, the modified frame cross-section of the invention also preferably can be beneficially used with prior art retaining means. FIG. 21 shows just three of the many such embodiments.

Figure 22:
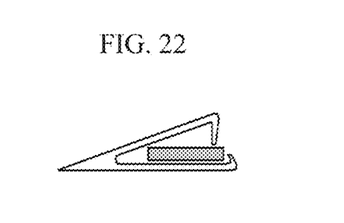
FIG. 22 shows one of the many embodiments of a retaining clip of the invention beneficially assembled with a prior art frame element.

FIG. 22 similarly shows one of the many embodiments of a retaining clip of the invention beneficially assembled with a prior art frame element. Among other things, this assembly can provide increased ease and efficiency in cleaning and maintenance for tools, as compared with prior art frames assembled with prior art retaining clips.

Figure 23:
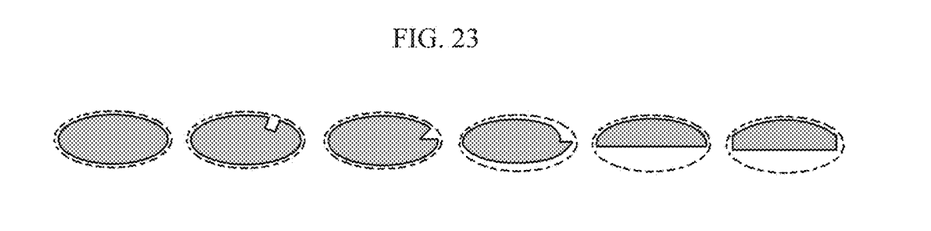
FIG. 23 shows still more of the many embodiments in which the invention can be practiced, including using generally elliptical profiles/shapes, half-ellipses or other portions of ellipses, and/or having notches/protrusions with which the retaining clip can engage to prevent the retaining clip from rotating on the frame during use.

Although much of the foregoing discussion of "non-circular" and "non-rectangular" cross sections is focused on generally triangular embodiments, persons of ordinary skill in the art will understand that a variety of such shapes that can be used to accomplish one or more of the invention's objectives. Just a few of the many examples of such embodiments are shown in FIG. 23, and they include generally elliptical shapes, half-ellipses or other portions of ellipses, and/or having notches/protrusions with which the retaining clip can engage to prevent the retaining clip from rotating during use.

Figure 24:
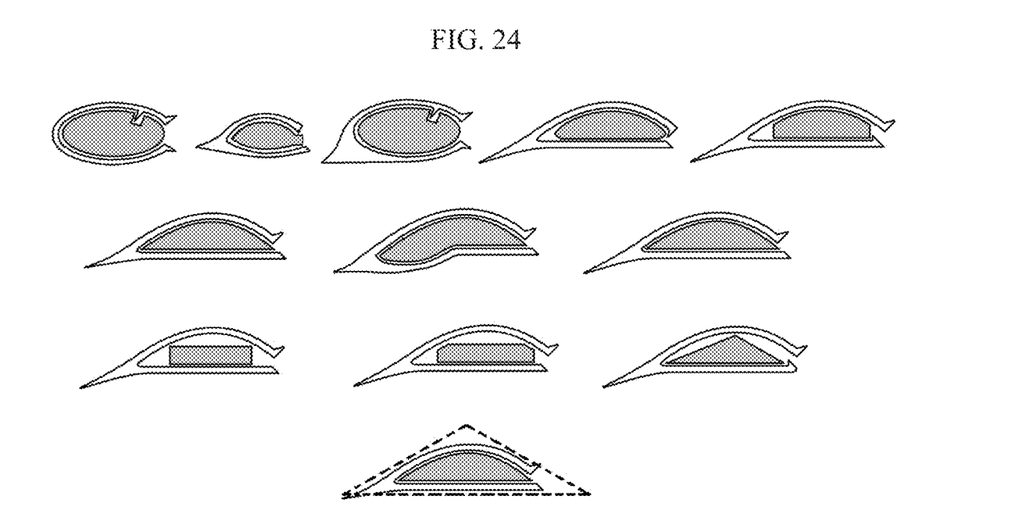
FIG. 24 illustrates embodiments of the invention in which the retaining means is generally elliptical, and how such retaining clips can be used with elliptical, triangular, or rectangular frames.
Figure 25:
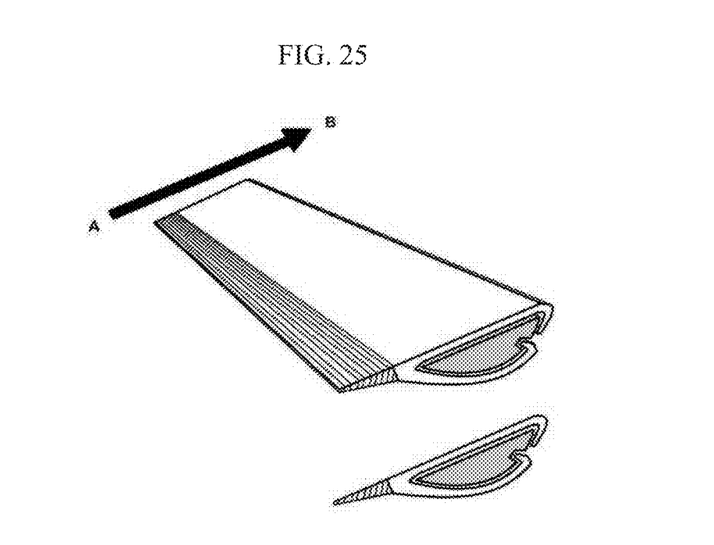
FIG. 25 shows a semi-elliptical cross-shaped embodiment of the invention that effectively resembles a triangle with "rounded" corners.

In certain embodiments of the invention (see examples in FIG. 24), the retaining means also can be generally elliptical, and those retaining clips can be used with elliptical, triangular, or rectangular frames. Depending upon the configuration, some semi-elliptical shapes effectively resemble triangles with "rounded" corners. FIG. 25 illustrates in perspective view one such assembled "elliptical" frame and clip element.

Figure 26:
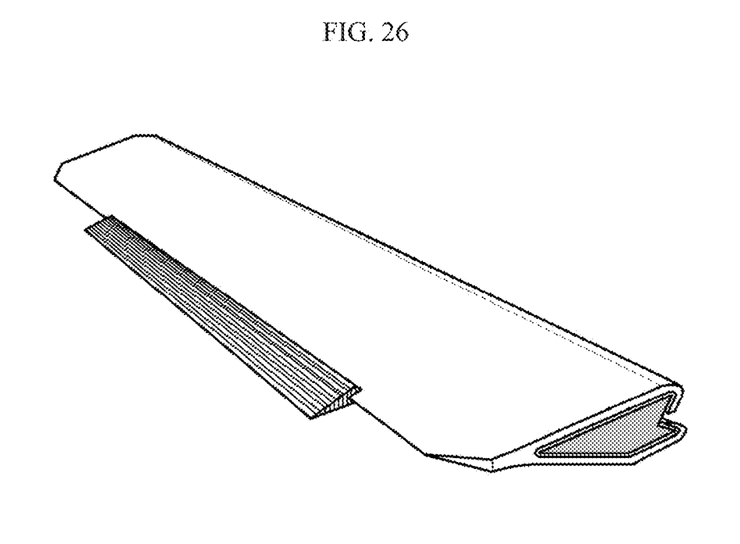
FIG. 26 illustrates an embodiment having a "leading" scooping edge of a coextruded retaining means that extends only a portion of the rim's length rather than more completely enwrapping the rim/mouth of the tool.

Other embodiments of the invention can include varying the shape of the frame and/or the retaining clip along the longitudinal length or rim of the "mouth" of the assembled tool. The frame can be formed through any suitable process, such as aluminum extrusion and/or machined/ground to have a desired cross-section (such as a generally triangular cross-section) at one or more positions along the rim, and the retaining clip's cross section likewise can vary from position to position along the tool's rim. In FIG. 26, for example, the "leading" scooping edge of a coextruded retaining means may extend only a portion of the rim's length rather than more completely enwrapping the rim/mouth. Such embodiments may involve design considerations to be balanced in specific situations and/or for specific applications. For example, it may be more costly and complicated to fabricate embodiments such as shown in FIG. 26, but such embodiments may also increase strength, reduce material requirements, and/or may be more "eco-friendly" (by providing a better strength/weight ratio—thus using less material to make a satisfactory tool).

The apparatus and methods of my invention have been described with some particularity, but the specific designs, configurations, and steps disclosed are not to be taken as delimiting of the invention in that various modifications will at once make themselves apparent to those of ordinary skill in the art, all of which will not depart from the essence of the invention, and all such changes and modifications are intended to be encompassed within the appended claims.

Figure 27:
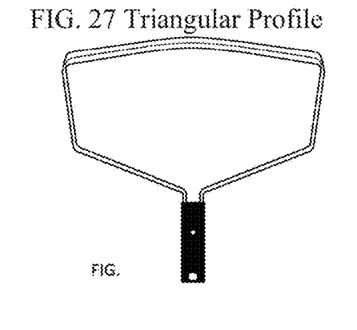
FIGS. 27-29 are plan views of three of the many alternative embodiments of assembled tools/frames having mouth portions formed from elements having triangular/elliptical/other profiles or cross-sections
Figure 28:
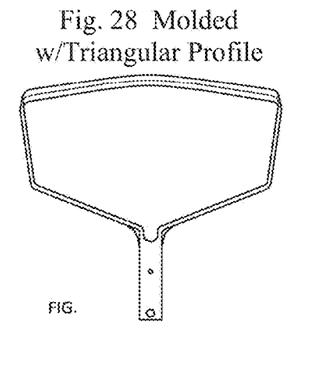
Figure 29:
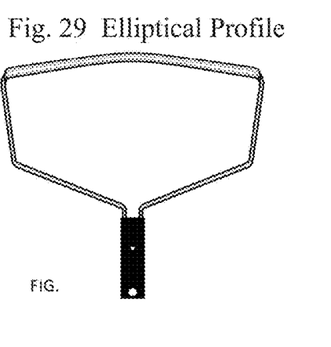

FIGS. 27-29 illustrate some of the many assembled tools/frames having mouth portions formed from elements having triangular/elliptical/other profiles or cross-sections. As shown, these are connected to tubular attachment means, but persons of ordinary skill in the art will understand that they can be assembled to poles in any suitable manner and/or may used by hand (without any pole) or in a wide range of other configurations:

The invention claimed is:

1. A tool for cleaning debris from swimming pools, including:
a frame member having a generally semi-circular cross section along at least a length of the frame member;
a scooping lip for retaining a net on said frame member, said scooping lip having a cross section including an upper portion having a generally semi-circular profile and a lower portion having a generally straight profile when viewed in cross section.

2. The tool of claim 1, wherein a front-most edge of the scooping lip forms a contact portion of the scooping lip, and a rearward edge of the scooping lip forms a gripping portion of the scooping lip.

3. The tool of claim 2, in which said contact portion and said gripping portion are integrally formed with each other.

4. The tool of claim 2, in which said contact portion and gripping portion are made from different materials and are formed simultaneously as a co-extrusion.

5. The tool of claim 4, in which the different materials differ in the degree of their respective rigidity or flexibility.

6. The tool of claim 4 or claim 5, in which the different materials differ in color.

7. The tool of claim 1, in which a cross-section of said frame is a half-moon shape.

8. A tool for cleaning debris from swimming pools, including:
a scooping lip for retaining a net on said tool, said scooping lip having a cross section including an upper portion having a generally semi-circular profile and a lower portion having a generally straight profile when viewed in cross section;
a detent mechanism provided on said scooping lip's lower portion having a generally straight profile;
wherein a front-most edge of the scooping lip forms a contact portion of the scooping lip, and a rearward edge of the scooping lip forms a gripping portion of the scooping lip, in which said contact portion and gripping portion are made from different materials and are formed simultaneously as a co-extrusion.

9. The tool of claim 8, in which the different materials differ in the degree of their respective rigidity or flexibility.

10. The tool of claim 8 or claim 9, in which the different materials differ in color.

11. The tool of claim 8, in which a cross-section of said scooping lip is a half-moon shape.

12. The tool of claim 8, in which the scooping lip is mounted on a frame having at least part of its cross section in the shape of a half-moon.

13. The tool of claim 8, in which the scooping lip is mounted on a frame having at least part of its cross section in the shape of a triangle.

14. The tool of claim 8, in which the scooping lip is mounted on a frame having at least part of its cross section in the shape of a circle.

15. The tool of claim 8, in which the scooping lip is mounted on a frame having at least part of its cross section in the shape of a rectangle.

16. The tool of claim 8, in which the scooping lip is operatively engaged with a frame having at least part of its cross section in the shape of a half-moon.

17. The tool of claim 8, in which the scooping lip is operatively engaged with a frame having at least part of its cross section in the shape of a triangle.

18. The tool of claim 8, in which the scooping lip is operatively engaged with a frame having at least part of its cross section in the shape of a circle.

19. The tool of claim 8, in which the scooping lip is operatively engaged with a frame having at least part of its cross section in the shape of a rectangle.

* * * * *